US009963143B2

(12) United States Patent
Lu et al.

(10) Patent No.: US 9,963,143 B2
(45) Date of Patent: May 8, 2018

(54) SYSTEM AND METHOD FOR VEHICLE SUBSYSTEM FAILURE MITIGATION

(71) Applicant: Ford Global Technologies, LLC, Dearborn, MI (US)

(72) Inventors: Jianbo Lu, Northville, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 15/046,645

(22) Filed: Feb. 18, 2016

(65) Prior Publication Data

US 2017/0240167 A1  Aug. 24, 2017

(51) Int. Cl.
*B60W 30/02* (2012.01)
*G05D 1/00* (2006.01)
*B60W 10/18* (2012.01)
*B60W 30/18* (2012.01)
(Continued)

(52) U.S. Cl.
CPC ............ *B60W 30/02* (2013.01); *B60W 10/06* (2013.01); *B60W 10/10* (2013.01); *B60W 10/18* (2013.01); *B60W 30/18136* (2013.01); *G05D 1/0088* (2013.01); *B60W 2400/00* (2013.01); *B60W 2510/18* (2013.01); *B60W 2520/10* (2013.01); *B60W 2710/0666* (2013.01); *B60W 2710/105* (2013.01); *B60W 2710/18* (2013.01)

(58) Field of Classification Search
CPC .......... B60W 20/00; B60W 20/10; G07C 5/00
USPC ........... 701/31.9, 45, 65, 67, 70; 180/65.275
See application file for complete search history.

(56) References Cited

U.S. PATENT DOCUMENTS 7,778,741 B2   8/2010 Rao et al.
2008/0147277 A1* 6/2008 Lu .................. B60W 30/085
701/45
(Continued)

FOREIGN PATENT DOCUMENTS

WO   WO 2004091942 A1   10/2004

OTHER PUBLICATIONS

Filev et al., "Control With Cloud Computing", Focus on Dynamic Systems & Control, Mar. 2013 (8 pages).

*Primary Examiner* — Thomas G Black
*Assistant Examiner* — Wae L Louie
(74) *Attorney, Agent, or Firm* — Frank A. MacKenzie; Bejin Bieneman PLC

(57) ABSTRACT

A computer for, e.g., a mass market passenger vehicle operable by a virtual driver in autonomous and/or semi-autonomous mode, is programmed to determine that a current vehicle braking capacity exceeds each of a first braking target and a mitigation threshold at a current vehicle speed. The computer is further programmed to compare the current vehicle speed to an engine breaking threshold and generate a transmission control message providing data to operate a vehicle transmission. Where the current vehicle speed is above the engine braking threshold, the transmission control message provides data to operate the vehicle transmission to inhibit transfer of an input torque through the vehicle transmission. Additionally, where the current vehicle speed is below a wheel lock threshold, the transmission control message further provides data to operate the vehicle transmission to inhibit rotation of an output shaft of the vehicle transmission.

20 Claims, 2 Drawing Sheets

(51) Int. Cl.
 *B60W 10/06* (2006.01)
 *B60W 10/10* (2012.01)

(56) References Cited

U.S. PATENT DOCUMENTS

| | | | | |
|---|---|---|---|---|
| 2010/0162027 | A1* | 6/2010 | McCroskey | G05B 23/0291 714/1 |
| 2012/0207620 | A1* | 8/2012 | Dalum | B60K 6/12 417/44.1 |
| 2012/0305360 | A1* | 12/2012 | Kitaori | F16H 63/3466 192/219.4 |
| 2013/0103274 | A1* | 4/2013 | Binder | B60W 40/06 701/65 |
| 2013/0131942 | A1* | 5/2013 | Duraiswamy | F16D 43/284 701/67 |
| 2013/0304310 | A1* | 11/2013 | Inada | G07C 5/006 701/31.9 |
| 2014/0171260 | A1* | 6/2014 | Dalum | B60W 20/10 477/5 |
| 2015/0005982 | A1* | 1/2015 | Muthukumar | B60T 1/10 701/1 |
| 2015/0066326 | A1* | 3/2015 | Furuyama | B60T 7/042 701/70 |
| 2016/0251005 | A1* | 9/2016 | Morselli | B60T 8/1708 701/50 |
| 2016/0318509 | A1* | 11/2016 | Rycroft | B60T 8/1755 |
| 2017/0057506 | A1* | 3/2017 | Jerger | B60W 10/06 |
| 2017/0240167 | A1* | 8/2017 | Lu | B60W 10/06 |

* cited by examiner

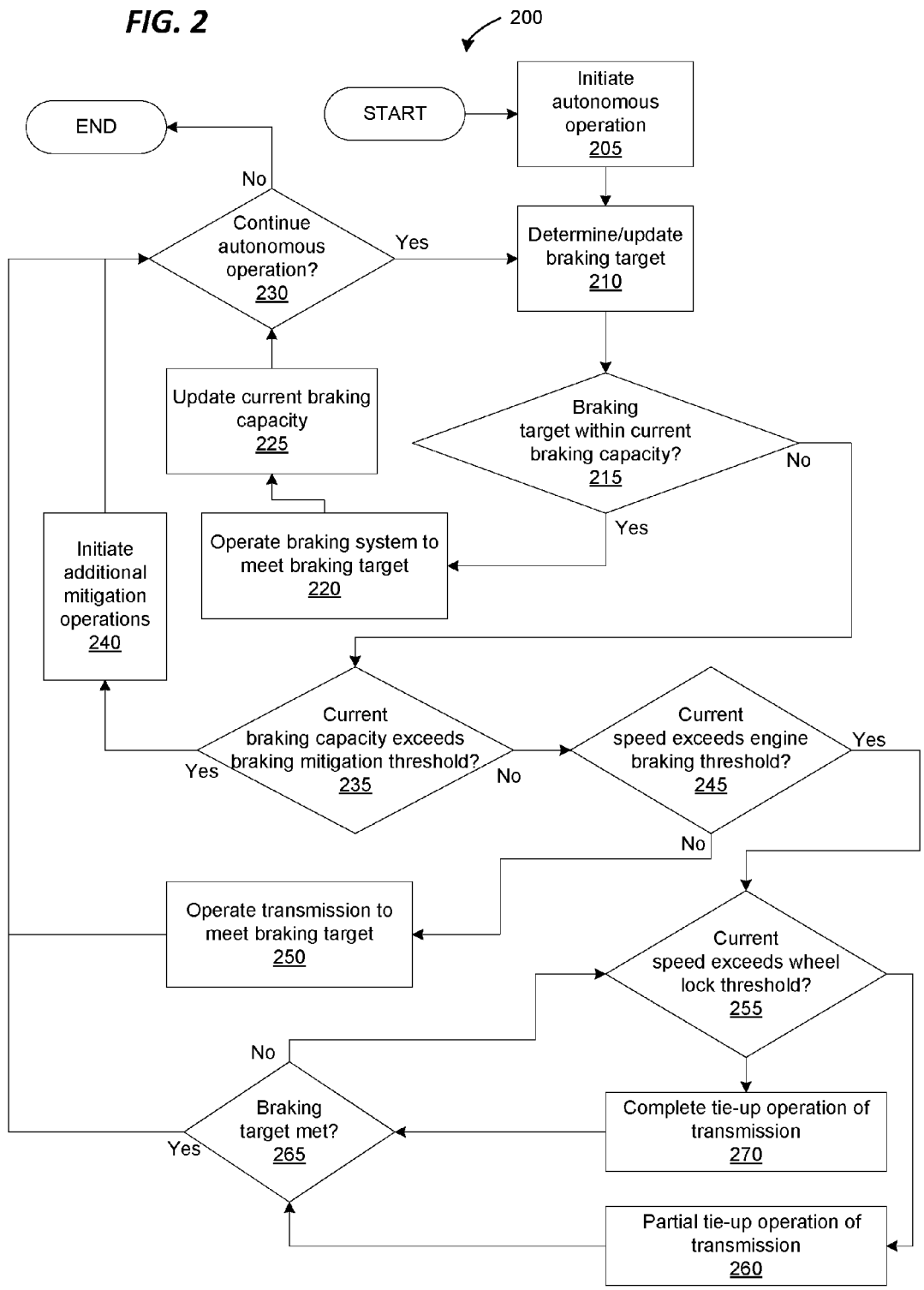

SYSTEM AND METHOD FOR VEHICLE SUBSYSTEM FAILURE MITIGATION

BACKGROUND

For any given driving operation of, e.g., a mass market passenger vehicle, numerous external and/or internal condition changes may render the operation difficult or unachievable. An autonomous vehicle, or a vehicle which may be operated in an autonomous or a semi-autonomous mode, must include the virtual driver and controls systems that incorporate automated mitigation operations for such changing conditions, to enable the virtual driver to safeguard the operations of the vehicle. Furthermore, it may be possible for the virtual driver and controls systems of an autonomous vehicle to have access to a relatively wider variety of vehicle systems, and/or an increased number of components of vehicle systems, than those typically available to a manual operator of a vehicle. Accordingly, providing mitigation operations through virtual driver and controls systems of an autonomous vehicle, including operations outside of the typical range of controls for manual operation in mass market passenger vehicles, would be desirable.

DRAWINGS

FIG. 2 is a diagram of an example process for mitigating a vehicle subsystem failure in accordance with the principles of the present disclosure.

DETAILED DESCRIPTION

Overview

Figure 1:
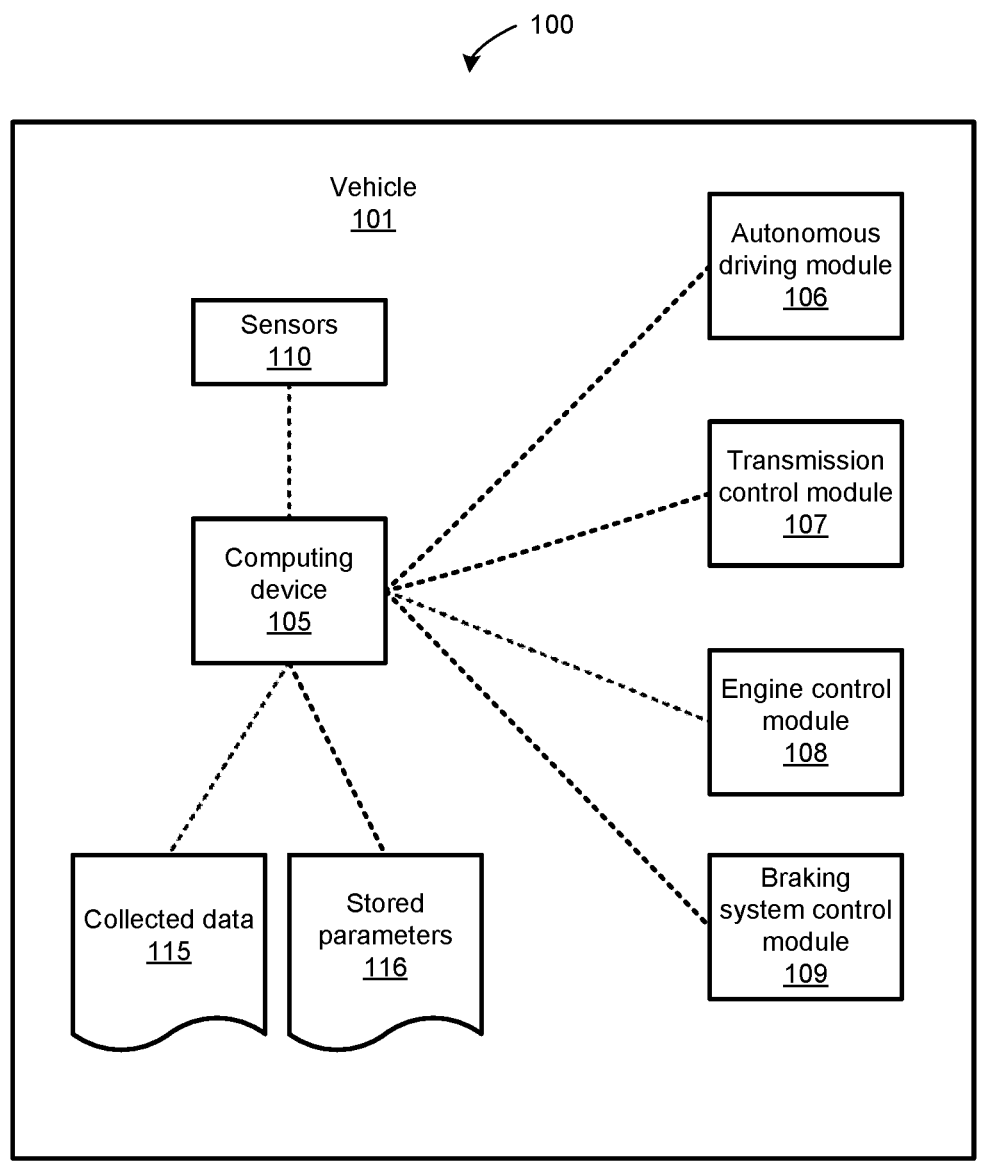
FIG. 1 illustrates an example vehicle system for providing mitigation operations in accordance with the principles of the present disclosure.

FIG. 1 is a block diagram of an exemplary autonomous vehicle system 100 for a vehicle 101, e.g., a mass market passenger vehicle operable by a virtual driver in an autonomous and/or a semi-autonomous mode. The vehicle 101 includes the vehicle computer 105 that is configured to receive information, e.g., collected data 115, from one or more sensors 110 related to various components or conditions of the vehicle 101, e.g., components such as a braking system, a steering system, a powertrain, etc., and/or conditions such as vehicle 101 speed, acceleration, pitch, yaw, roll, etc. The vehicle 101 includes an autonomous driving module 106 and, e.g., in the module 106, generally includes instructions for receiving data, e.g., from one or more sensors 110. The autonomous driving module 106 may be included in or separate from the computer 105. Accordingly, the computer 105 and/or the autonomous driving module 106 may provide a virtual driver and controls systems of the vehicle 101 for autonomous and/or semi-autonomous operation of the vehicle 101.

The system 100 also includes a transmission control module 107, an engine control module 108, and a braking system control module 109, each of which may be included in or separate from the computer 105. In the transmission control module 107, the engine control module 108, and the braking system control module 109, e.g., the vehicle 101 generally includes instructions for receiving data, e.g., from one or more sensors 110, the computer 105, the autonomous driving module 106 and one or more control devices, such as gear shifters and gas pedals.

The computer 105 may instruct the autonomous driving module 106 according to one or more stored parameters 116. By evaluating collected data 115 with respect to one or more stored parameters 116 being used during autonomous driving operations, the computing device 105 can determine whether to adjust one or more of the parameters 116. For example, the module 106 may change a parameter 116 to correspond with a temperature or another environmental condition, a status of a vehicle component or system, a detected object, the vehicle path, an oncoming vehicle, road condition, or the like. In comparison to the controls for a manual operator of the vehicle 101 (e.g. steering wheel, gearshift, etc.), the parameters 116 may correspond to a wider variety of vehicle systems, an increased number of components of vehicle systems, and/or a greater amount of control variables of components or systems, such that the computer 105 and/or autonomous driving module 106 may have, as the virtual driver and autonomous control system, a much wider scope of vehicle operation control than a manual operator of the vehicle. For example, the parameters 116 may include those related to partial and/or complete tie-up of the transmission of the vehicle 101, which operations of the transmission may be outside of any manual controls of the vehicle 101.

Exemplary System Elements

Referring again to FIG. 1, the vehicle computer 105 for vehicle 101 that generally include a processor and a memory, the memory including one or more forms of computer-readable media, and storing instructions executable by the processor for performing various operations, including as disclosed herein. Further, the computer 105 may include more than one computing device, e.g., the autonomous driving module 106 and other controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or any other suitable in-vehicle communications bus such as JASPAR, LIN, SAE J1850, AUTOSAR, MOST, etc., and/or may use other wired or wireless protocols, e.g., Bluetooth, etc. That is, the computer 105 can communicate via various mechanisms that may be provided in the vehicle 101 and/or other devices such as a user device. The vehicle 101 may also include one or more electronic control units specifically for receiving and transmitting diagnostic information such as an onboard diagnostics connector (OBD-II). Accordingly, the computer 105 may also have a connection to an onboard diagnostics connector (OBD-II) port, e.g., according to the J1962 standard. Via the Ethernet bus, CAN bus, OBD-II connector port, and/or other wired or wireless mechanisms, the computer 105 may transmit messages to various devices in a vehicle and/or receive messages from the various devices, e.g., controllers, actuators, sensors, etc. In addition, the computer 105 may be configured for communicating with remote devices and/or an external network, which may include various wired (e.g., cable and fiber) and/or wireless (e.g., cellular, wireless, satellite, microwave, and radio frequency) networking technologies, e.g., wired and/or wireless packet networks, wireless communication networks (e.g., using Bluetooth, IEEE 802.11, etc.), local area networks (LAN) and/or wide area networks (WAN), including the Internet, providing data communication services, etc.

The vehicle 101 autonomous driving module 106 uses data received in the computer 105, e.g., from various sensors, from a vehicle 101 communications bus, from a remote server or another vehicle, etc., so that the module 106 may, without a driver, control various vehicle 101 modules, components, and/or operations, including, e.g., the transmission control module 107 and the engine control module 108, to operate the vehicle 101 autonomously or semi-autonomously (i.e., control some but not all vehicle 101 operations). For example, the module 106 may be used to regulate vehicle 101 speed, acceleration, deceleration, steering, gear shifts, operation of components such as lights, windshield wipers, etc.

The vehicle 101 transmission control module 107 uses data received in the computer 105, e.g., from various sensors, from a vehicle 101 communications bus, from a remote server or another vehicle, etc., to operate the transmission of the vehicle 101, e.g. switch between gears, go into neutral, tie-up gears, and inhibit rotation of the output shaft. Likewise, the vehicle 101 engine control module 108 uses data received in the computer 105, e.g., from various sensors, from a vehicle 101 communications bus, from a remote server or another vehicle, etc., to operate the engine of the vehicle 101, e.g. adjust the output torque of the engine, and the vehicle 101 braking system control module 109 uses data received in the computer 105, e.g., from various sensors, from a vehicle 101 communications bus, from a remote server or another vehicle, etc., to operate the braking system of the vehicle 101. According to the principles of the present disclosure, data used by the transmission control module 107 includes dependent and/or controlled by manual inputs to the vehicle 101 and additional data outside of any manual controls of the vehicle 101. Therefore, during autonomous and/or semi-autonomous operations of the vehicle 101, the transmission control module 107 may generate and transmit instructions that have a relatively wider scope of vehicle operation control for the transmission of the vehicle 101 than those that may be generated as a result of manual operation of the vehicle 101.

Sensors 110 and other sources may provide data for autonomous or semi-autonomous operation of the vehicle 101. For example, various controllers in the vehicle 101 may provide data via a controller area network (CAN) bus, e.g., data relating to vehicle speed, acceleration, etc. Further, sensors 110 or the like may provide data to the computer 105, e.g., via a wired or wireless connection. Sensors 110 may include mechanisms such as RADAR, LIDAR, cameras or the like, sonar, a breathalyzer, motion detectors, etc. In addition, sensors 110 may include devices in the vehicle 101 operable to detect a temperature, position, change in position, rate of change in position, etc., of vehicle 101 components such as the computer 105, a steering wheel, brake pedal, accelerator, gearshift lever, etc. The sensors 110 may measure values relating to operation of the vehicle 101 and of the surrounding vehicles and environment. For example, the sensors 110 may measure the speed and location of the vehicle 101, a speed and location of surrounding vehicles relative to the vehicle 101, and/or environmental characteristics, e.g., altitude, speed, fuel volume, acceleration, ambient temperature, etc. Further, sensors or the like, global positioning system (GPS) equipment, etc., could be included in a vehicle and configured as data collectors 110 to provide data directly to the computer 105, e.g., geo-coordinates (latitude and longitude) of the vehicle 101 and/or geo-coordinates, a street address or the like, etc. of a location of a target destination of the vehicle 101, via a wired or wireless connection.

A memory of the computer 105 generally stores the collected data 115. Collected data 115 may include a variety of data collected in a vehicle 101. Examples of collected data 115 are provided above, and moreover, data 115 is generally collected using one or more sensors 110, and may additionally include data calculated therefrom in the computer 105, and/or at the server 125. In general, collected data 115 may include any data that may be gathered by a sensor 110 and/or computed from such data. Accordingly, collected data 115 could include a variety of data related to vehicle 101 operations and/or performance, e.g. the temperature of vehicle 101 components, data received from another vehicle, as well as data related to environmental conditions, ambient temperature, road conditions, etc. relating to the vehicle 101. For example, collected data 115 could include data concerning a vehicle 101 speed, acceleration, pitch, yaw, roll, braking, presence or absence of precipitation, tire pressure, tire condition, etc. A memory of the computer 105 may further store the parameters 116. Each of the parameters 116 generally governs control of a component of the vehicle 101. Stored parameters 116 may also include parameters for default operation of various vehicle 101 components.

Collected data 115 and/or stored parameters 116 may include data from sensors 110 and/or calculated by computer 105 determining and identifying a path for the vehicle 101. Such path data may include identification of a location at and/or a distance by which the vehicle 101 must achieve deceleration and/or stopping to avoid a collision, i.e. a braking target. For example, data from a GPS device included in the sensors 110 may identify a traffic stop; data from an external network may identify a traffic back-up; and data from nearby vehicles may identify an upcoming road hazard and/or accident. The vehicle 101 computer 105 may determine the braking, target, e.g. vehicle stopping location and/or distance, based on such collected data and/or stored parameters 116.

According to the principles of the present disclosure, also included among collected data 115 and/or stored parameters 116 may be variables, thresholds and other values for evaluating and controlling the operation of vehicle 101 and its subsystems, including, e.g., the braking system for vehicle 101. For example, the vehicle 101 computer 105 may calculate and/or update a current braking capacity of the vehicle 101, e.g. a minimum vehicle stopping distance based on at least a current speed of the vehicle 101 measured by, e.g., a speedometer among the sensors 110. The computer 105 may also incorporate, into the determination of the current braking capacity of the vehicle 101, data related to various external conditions, e.g. environmental conditions (precipitation, temperature, etc.) and path conditions (grade, road surface, etc.), which may affect the braking performance of the vehicle 101. Over time, the vehicle 101 computer 105 may update the vehicle braking capacity, to account for, e.g., braking system degradation and/or external condition changes. Should the braking system fail, e.g., by malfunction of a mechanical, hydraulic or electrical subsystem in the braking system, the computer 105 may include instructions to receive an error message with that information, and update or replace the braking capacity parameters among stored parameters 116 to reflect the braking system failure.

Collected data 115 and/or stored parameters 116 may be further include a braking mitigation threshold for the braking performance of the vehicle 101 at a given speed, and an engine braking threshold speed. For example, the mitigation threshold may be based on the maximum performance of alternative braking strategies, so that, at a given speed, the computer 105 may compare a current braking capacity of the vehicle 101 and the braking mitigation threshold to determine if executing a mitigation operation would provide any substantial benefit over operation of the braking system towards meeting the braking target. Likewise, the engine braking threshold speed may be based on the current speed of the vehicle 101 and other operating conditions of the vehicle 101, so that the computer 105 may compare the current vehicle speed and determine whether engine braking through downshifting the transmission would provide any substantial benefit towards meeting the braking target. If so, the computer 105 may generate a transmission control message and transmit it to the transmission control module 107 to downshift the transmission of the vehicle 101 accordingly.

According to the principles of the present disclosure, the virtual driver and controls systems of the vehicle 101, through, e.g., the computer 105 and/or the autonomous driving module 106, may operate certain vehicle systems, and/or components of vehicle systems, with a wider scope of operation control than that of the controls of a manual operator of a vehicle. For example, a manual operator of the vehicle 101 may be able to operate vehicle 101 to switch the transmission between different gears and neutral. However, a manual operator of a vehicle 101 may be unable to, by way of a direct command, partially or completely tie-up the transmission, so as to prevent transfer of torque therethrough and/or to prevent rotation of a transmission output shaft. In contrast, according to the principles of the present disclosure, where the braking system of the vehicle 101 has failed, or otherwise the performance of the braking system meets the mitigation threshold, and where the speed of vehicle 101 exceeds the engine braking threshold, the computer 105 may generate a transmission control message and transmit it to the transmission control module 107 to initiate a partial or complete tie-up of the transmission of the vehicle 101. Where the current speed of the vehicle 101 exceeds a wheel lock threshold, the computer 105 may, through the transmission control message, initiate a partial transmission tie-up, to inhibit the transfer of torque through the transmission of the vehicle 101, e.g., by disengaging the output shaft from the gears of the transmission of the vehicle 101. In another example, where the current speed of the vehicle 101 is lower than the wheel lock threshold, the computer 105 may, through the transmission control message, initiate a complete transmission tie-up, inhibiting both transfer of torque through the transmission and rotation of the output shaft of the transmission and, thus, one or more of the wheels of the vehicle 101.

Where the braking system is capable of meeting a braking target, the vehicle 101 computer 105, via the braking system control module 109, generates a braking control message providing data to operate the vehicle braking system to meet that braking target. The computer 105 may then, with and/or based on collected data 115 generated during the performance of that braking operation, update the current vehicle braking capacity. Accordingly, over time, the computer 105 may update the current vehicle braking capacity to reflect degradation of the braking system.

The current vehicle braking capacity may be updated if the computer 105 receives a failure message for the vehicle braking system, providing data to indicate one or more malfunctioning conditions of the vehicle braking system. The current vehicle braking capacity may also be updated based on one or more current vehicle environmental conditions and/or based on one or more current vehicle path conditions. For example, the current vehicle braking capacity may be determined to be decreased in slippery road conditions or on a downhill path. Likewise, the engine braking threshold may also be updated based on one or more current vehicle environmental conditions and/or one or more current vehicle path conditions. For example, the engine braking threshold may likewise be decreased on a downhill path, but may be less affected than the current vehicle braking capacity in, e.g., slippery road conditions.

Example Process

FIG. 2 is a diagram of an example process 200 for a mitigation operation of one of the vehicle 101 subsystems. The process 200 is described in the context of auxiliary braking operations via operation of the vehicle 101 transmission in the event of braking degradation or other braking system failure; the process 200 could apply to other kinds of operations.

The process 200 begins in a block 205 in which the computer 105 and autonomous driving module 106 initiate autonomous or semi-autonomous operation of the vehicle 101, e.g., the module 106 is used to regulate one or more of vehicle 101 speed, acceleration, deceleration, steering, gear shifts, operation of components such as lights, windshield wipers, etc. At a block 210, the computer 105 determines a braking target for the vehicle 101. For example, one of sensors 110 may identify a point at which the vehicle 101 must be at a relatively slower speed, or must be stopped, in order to avoid a collision. Examples of such collected data from vehicle 101 components such as ECUs, sensors 110, or the like, include data relating to an environment in which the vehicle 101 is travelling (e.g., ambient light level, presence or absence of precipitation, outside air temperature, etc.), vehicle 101 operating parameters (e.g., vehicle 101 speed, heading, steering angle, activation of brakes, throttle setting, etc.), information concerning upcoming terrain from sensors 110 and/or a navigation system (e.g., rough road, change in elevation, curve, etc.). Based on such collected data 115, or other data among stored parameters 116 and/or data calculated by the computer 105 based on collected data 115 and/or stored parameters 116, the computer 105 may determine the braking target.

Next, in a block 215, the computer 105 determines whether the braking target is within the current braking capacity of the vehicle 101. For example, if the braking target is a stopping distance, and the current breaking capacity may allow for a shorter stopping distance, the computer 105 determines the braking target to be within the current braking capacity of the vehicle 101, and the process 200 continues to a block 220. The computer 105, by way of the braking system module 109, determines and provides instructions for the operation of the braking system of the vehicle 101 (i.e. provides a braking control message) to meet the braking target. Next, at a block 225, the computer 105 may update the current braking capacity of the vehicle 101, based on the performance of the braking system in meeting the braking target. Then, the process 200 continues to a block 230, in which the computer 105 determines whether autonomous operation of the vehicle 101 is to continue. If so, the process 200 returns to the block 210, and the braking target may be updated from the first or previous value to a second or new value. If not, e.g., the vehicle 101 has reached its destination, or a user of the vehicle has taken over control of the vehicle, the process 200 ends.

If, at the block 215, the braking target is not within the current braking capacity of the vehicle 101, the process 200 continues to a block 235, in which the computer 105 determines whether the current braking capacity exceeds a braking mitigation threshold stored among the stored parameters 116. As set forth in the example hereinabove, the mitigation threshold may be based on the maximum performance of alternative braking strategies, so that, at a given speed, the computer 105 may compare a current braking capacity of the vehicle 101 and the braking mitigation threshold to determine if executing a mitigation operation would provide any substantial benefit over operation of the braking system towards meeting the braking target.

If the current braking capacity does exceed the braking mitigation threshold, i.e. the braking mitigation operations of the vehicle 101 would not be expected to provide any greater braking performance than the braking system, the process 200 continues to a block 240, in which the computer 105 may initiate additional or alternative mitigation operations, such as steering and path planning control. Next, the process 200 continues to the block 230, where the computer 105 determines whether autonomous operation of the vehicle 101 is to continue, as set forth above.

At the block 235, if the current braking capacity does not exceed the braking mitigation threshold, i.e. the braking mitigation operations of the vehicle 101 would be expected to provide greater braking performance than the braking system, the process 200 continues to a block 245, to initiate implementation of the braking mitigation operations. In the block 245, the computer 105 determines whether the current vehicle 101 speed exceeds an engine braking threshold, e.g. stored among parameters 116. If not, the process 200 continues to a block 250, in which the computer 105, via the transmission control module 107, may determine and provide instructions for operation of the transmission of the vehicle 101 (e.g. provide a transmission control message) to meet the braking target, e.g. by downshifting or coasting in neutral. For example, if the computer 105 determines that the upcoming vehicle path includes an incline, it may be determined that a braking target can be achieved by downshifting or coasting in neutral alone, even if the braking system may be unavailable. Next, the process 200 continues to the block 230, where the computer 105 determines whether autonomous operation of the vehicle 101 is to continue, as set forth above.

If, at the block 245, the computer 105 determines that the current vehicle 101 speed exceeds the engine braking threshold, the process 200 continues to a block 255 to initiate alternative braking operation through partial or complete transmission tie-up operations. At the block 255, the computer 105 determines whether the current speed exceeds a wheel lock threshold, e.g., among stored parameters 116. If so, at a block 260, the computer 105, via the transmission control module 107, may determine and transmit instructions (i.e. provide a transmission control message) to operate the transmission in partial tie-up state, i.e. in which the gears are decoupled from the output shaft to inhibit transfer of torque from through the transmission. Next, the process continues to a block 265, where the computer 105 determines whether the braking target has been met. If so, the process 200 continues to the block 230, where the computer 105 determines whether autonomous operation of the vehicle 101 is to continue, as set forth above.

If, at the block 265, the computer 105 determines that the braking target has not been met, the process 200 returns to the block 255. If, whether initially or upon return, the computer 105 determines at the block 255 the current vehicle 101 speed does not exceed the stored wheel lock threshold, the process 200 continues to a block 270, and the computer, by way of the transmission control module 107, may determine and transmit instructions (i.e. provide a transmission control message) to operate the transmission of the vehicle 101 in a complete tie-up state, i.e. in which both torque is inhibited from transferring through the transmission and the output shaft, and thus at least one of the vehicle 101 wheels, is inhibited from rotating.

Initiating transmission tie-up operations, e.g. at the blocks 260 and 270, may include the computer 105 receiving a status message for the vehicle transmission, which message provides data to indicate a gear currently engaged by the vehicle transmission. For example, for different driving gears of the vehicle 101, different parameters for optimal or most efficient tie-up may be stored among parameters 116. Accordingly, the computer may also base a transmission control message on the status message, e.g., by selecting and transmitting operational parameters corresponding to the currently engaged gear.

Transmission tie-up operations, e.g. at the blocks 260 and 270 of the process 200, may also include parallel control of the vehicle 101 engine. For example, in order to minimize heat generation in the transmission fluid during tie-up operations, the computer 105 may contemporaneously determine and generate an engine control message to provide data to operate a vehicle engine to reduce torque output of the vehicle engine.

Next, the process continues to a block 265, where the computer 105 determines whether the braking target has been met. If so, the process 200 continues to the block 230, where the computer 105 determines whether autonomous operation of the vehicle 101 is to continue, as set forth above.

Conclusion

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
    determining a current vehicle braking capacity exceeds each of a location of a first braking target and a mitigation threshold at a current vehicle speed;
    comparing the current vehicle speed to an engine braking threshold; and
    generating a transmission control message providing data to operate a vehicle transmission;
    wherein, where the current vehicle speed is above the engine braking threshold, the transmission control message provides data to operate the vehicle transmission to inhibit transfer of an input torque through the vehicle transmission; and
    wherein, where the current vehicle speed is below a wheel lock threshold, the transmission control message further provides data to operate the vehicle transmission to inhibit rotation of an output shaft of the vehicle transmission.

2. The method of claim 1, further comprising:
    generating a braking control message providing data to operate a vehicle braking system to meet a second braking target; and
    updating the current vehicle braking capacity based on data from the operation of the vehicle braking system to meet the second braking target.

3. The method of claim 1, wherein, where the current vehicle speed is below the engine braking threshold, the transmission control message provides data to operate the vehicle transmission to engage one of a low gear setting and a neutral setting, to reduce transfer of the input torque through the vehicle transmission.

4. The method of claim 1, further comprising:
    receiving a failure message for a vehicle braking system, the failure message providing data to indicate one or more malfunctioning conditions of the vehicle braking system; and
    updating the current vehicle braking capacity based on the failure message.

5. The method of claim 1, further comprising:
    receiving a status message for the vehicle transmission, the status message providing data to indicate a gear engaged by the vehicle transmission; and
    generating the transmission message, where the current vehicle speed is above the engine braking threshold, based on the status message.

6. The method of claim 1, further comprising:
    generating an engine control message providing data to operate a vehicle engine;
    wherein, where the current vehicle speed is above the engine braking threshold, the engine control message providing data to reduce torque of the vehicle engine.

7. The method of claim 1, further comprising:
    updating the current vehicle braking capacity based on one or more current vehicle environmental conditions.

8. The method of claim 1, further comprising:
    updating the current vehicle braking capacity based on one or more current vehicle path conditions.

9. The method of claim 1, further comprising:
    updating the engine braking threshold based on one or more current vehicle environmental conditions.

10. The method of claim 1, further comprising:
    updating the engine braking threshold based on one or more current vehicle path conditions.

11. A system, comprising:
    a computer comprising a processor and a memory, the memory storing instructions executable by the processor to:
    determine a current vehicle braking capacity exceeds each of a location of a first braking target and a mitigation threshold at a current vehicle speed;
    compare the current vehicle speed to an engine braking threshold; and
    generate a transmission control message providing data to operate a vehicle transmission;
    wherein, where the current vehicle speed is above the engine braking threshold, the transmission control message provides data to operate the vehicle transmission to inhibit transfer of an input torque through the vehicle transmission; and
    wherein, where the current vehicle speed is below a wheel lock threshold, the transmission control message further provides data to operate the vehicle transmission to inhibit rotation of an output shaft of the vehicle transmission.

12. The system of claim 11, wherein the memory stores further instructions executable by the processor to:
    generate a braking control message providing data to operate a vehicle braking system to meet a second braking target; and
    update the current vehicle braking capacity based on data from the operation of the vehicle braking system to meet the second braking target.

13. The system of claim 11, wherein, where the current vehicle speed is below the engine braking threshold, the transmission control message provides data to operate the vehicle transmission to engage one of a low gear setting and a neutral setting, to reduce transfer of the input torque through the vehicle transmission.

14. The system of claim 11, wherein the memory stores further instructions executable by the processor to:
    receive a failure message for a vehicle braking system, the failure message providing data to indicate one or more malfunctioning conditions of the vehicle braking system; and
    update the current vehicle braking capacity based on the failure message.

15. The system of claim 11, wherein the memory stores further instructions executable by the processor to:
    receive a status message for the vehicle transmission, the status message providing data to indicate a gear engaged by the vehicle transmission; and generate the transmission control message, where the current vehicle speed is above the engine braking threshold, based on the status message.

16. The system of claim 11, wherein the memory stores further instructions executable by the processor to:
generate an engine control message providing data to operate a vehicle engine;
wherein, where the current vehicle speed is above the engine braking threshold, the engine control message providing data to reduce torque of the vehicle engine.

17. The system of claim 11, wherein the memory stores further instructions executable by the processor to:
update the current vehicle braking capacity based on one or more current vehicle environmental conditions.

18. The system of claim 11, wherein the memory stores further instructions executable by the processor to:
update the current vehicle braking capacity based on one or more current vehicle path conditions.

19. The system of claim 11, wherein the memory stores further instructions executable by the processor to:
update the engine braking threshold based on one or more current vehicle environmental conditions.

20. The system of claim 11, wherein the memory stores further instructions executable by the processor to:
update the engine braking threshold based on one or more current vehicle path conditions.

* * * * *